US006325547B1

(12) United States Patent
Cammons et al.

(10) Patent No.: US 6,325,547 B1
(45) Date of Patent: Dec. 4, 2001

(54) OPTICAL CONNECTOR HAVING A HOUSING ASSEMBLY THAT IS COMPRISED OF POLYPHENYLSULFONE

(75) Inventors: Ray R. Cammons, Woodstock; John Francis May, Omaha; Norman Roger Lampert, Norcross, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/413,267

(22) Filed: Oct. 6, 1999

(51) Int. Cl.[7] .................. G02B 6/36; G02B 6/00
(52) U.S. Cl. .................. 385/76; 385/78; 385/139
(58) Field of Search .................. 385/76, 77, 78, 385/55, 56, 59, 139, 60, 92

(56) References Cited

U.S. PATENT DOCUMENTS

| | | | |
|---|---|---|---|
| 4,793,683 | 12/1988 | Cannon, Jr. et al. | 350/96.21 |
| 4,934,785 | 6/1990 | Mathis et al. | 350/96.21 |
| 5,101,463 | 3/1992 | Cubukciyan et al. | 385/72 |
| 5,212,752 | * 5/1993 | Stephenson et al. | 385/78 |
| 5,481,634 | 1/1996 | Anderson et al. | 385/76 |
| 5,588,079 | 12/1996 | Tanabe et al. | 385/78 |
| 5,764,834 | * 6/1998 | Hultermans | 385/60 |
| 6,017,154 | * 1/2000 | Carlisle et al. | 385/86 |

FOREIGN PATENT DOCUMENTS

| | | | |
|---|---|---|---|
| 0536 072 A1 | 1/1992 | (FR) | G02B/6/38 |
| 2 273 789 A | 8/1993 | (GB) | G02B/6/36 |
| 0 935 148 A1 | 1/1999 | (GB) | G02B/6/38 |
| 0 935 148 A3 | 1/1999 | (GB) | G02B/6/38 |
| 1 091 227 A1 | 9/2000 | (GB) | G02B/6/38 |

OTHER PUBLICATIONS

Typical Properties RADAL R Polyphenylsulfone [online], [retrieved on Mar. 17, 1999]. Retrieved from the Internet <URL: http://www.amocochem.com/pdf/imrrus.htm>.*

Typical Properties UDEL Polphenysulfone [online], [retrieved on Mar. 17, 1999]. Retrieved from the Internet <URL: http://www.amocochem.com/pdf/imrrus.htm>.*

RADEL R Polyphenysulfone [online], [retrieved on Mar. 17, 1999], Retrieved from the Internet <URL:wysiwyg://body.61/http://;www.amocochem.com/products/radel/radel-r.htm>.*

IDES Prospector Data Sheet, GE Plastics, Feb. 18, 1999.*

"Radel Resins—Engineering Data", Amoco Polymrs, Inc., Jan. 1999.

"Engineering Plastics for Performance and Value", Amoco Performance Products, Inc., Feb. 1993.

"Ultem Polyetherimide Resin—Properties Guide", GE Plastics, Dec. 1992.

* cited by examiner

Primary Examiner—Cassandra Spyrou
Assistant Examiner—Euncha Cherry
(74) Attorney, Agent, or Firm—Thomas, Kayden, Horstemeyer & Risley, LLP

(57) ABSTRACT

The present invention provides an optical connector having a housing assembly comprised of polyphenylsulfone (PPSU). PPSU has several characteristics that make it suitable for use with optical connectors including good flexibility, low sensitivity to molding parameters, good environmental properties, and compatibility with anaerobic adhesives, which are often used to attach the optical fiber to the ferrule in private networks. The connector preferably comprises a one-piece housing, which enhances the side-loading characteristics of the connector. The connector preferably comprises a ferrule assembly and an insert that are housed within the one-piece housing. The insert has a keying mechanism formed thereon that is adapted to mate with a keying mechanism formed in the housing. When the insert is inserted into the first end of the housing, the keying mechanism of the insert interlocks with the keying mechanism of the housing to lock the insert into place within the housing.

12 Claims, 7 Drawing Sheets

OPTICAL CONNECTOR HAVING A HOUSING ASSEMBLY THAT IS COMPRISED OF POLYPHENYLSULFONE

TECHNICAL FIELD OF THE INVENTION

The present invention relates to an optical connector for terminating an optical fiber and, more particularly, to an optical connector for terminating an optical fiber that has a housing assembly that is comprised of polyphenylsulfone.

BACKGROUND OF THE INVENTION

Optical fiber connectors are an essential part of substantially any optical fiber communication system. For instance, such connectors may be used to join segments of fiber into longer lengths; to connect fiber to active devices such as radiation sources, optical amplifiers, detectors and repeaters; or to connect fiber to passive devices such as switches and attenuators. The central function of an optical fiber connector is the maintenance of two optical fiber ends such that the core of one of the fibers is axially aligned with the core of the other fiber; and consequently, substantially all of the light from one fiber is coupled to the other fiber. This is a particularly challenging task because the light-carrying region (core) of an optical fiber is quite small. In singlemode optical fibers the core diameter is about 8 microns where 1 micron=1 $\mu$m=$10^{-3}$ mm. Another function of the optical fiber connector is to provide mechanical stability and protection to the junction in its working environment. For most optical connectors, achieving low insertion loss in coupling two fibers is generally a function of the transverse alignment of the fiber ends, the longitudinal gap between the ends, and the optical surface condition and end face geometry of either or both ends. Stability and junction protection is generally a function of connector design (e.g., minimization of the different thermal expansion and mechanical movement effects). An optical fiber connector typically includes a small capillary cylinder with a glass or plastic fiber installed along its central axis. This cylinder is interchangeably referred to as a ferrule or a plug.

In a connection between a pair of optical fibers, a pair of ferrules are butted together—end to end—and light travels from one to the other along their common central axis. In this conventional optical connection, it is highly desirable for the cores of the glass fibers to be precisely aligned in order to minimize the loss of light (insertion loss) caused by the connection; but as one might expect, it is presently impossible to make routine perfect connections. Manufacturing tolerances may approach "zero," but practical considerations such as cost, and the fact that slight misalignment is tolerable, suggest that perfection in such matters may be unnecessary.

One known design of an optical fiber connector is shown in U.S. Pat. No. 4,793,683; and its basic components comprise a precision molded plastic conical plug having an optical fiber centered therein, a compression spring disposed about a cylindrical portion of the plug, and a retention collar surrounding the plug and spring. The collar includes external threads that enable it to couple with another connector via a fixture having a precision molded alignment sleeve whose shape is best described as "biconic." This design has been superseded by the connector shown in U.S. Pat. No. 4,934,785 which comprises a cylindrical plug, a base member that holds the plug, a compression spring, and a cap that surrounds the plug and spring. In this design, only the cylindrical plug needs to be of high precision and is typically made from a ceramic material. When joining two of these plugs together, an alignment sleeve is used which comprises a split, thin-walled cylinder made of metal, ceramic or even plastic material. This alignment sleeve need not be as precise as the above-described biconic alignment sleeve.

Another known design of an optical fiber connector is disclosed in U.S. Pat. No. 5,212,752 (hereinafter the '752 patent). The optical connector comprises a ferrule assembly that includes a ferrule portion having a passageway for an optical fiber and a plug frame in which the ferrule assembly is disposed. Once the ferrule assembly has been disposed in the plug frame, the plug frame is assembled within another portion of the optical connector called a grip. The plug frame may be assembled within the grip in a plurality of rotational orientations with respect to the grip in such a way that the direction of eccentricity is aligned with a key of the grip. Once the plug frame has been coupled within the grip, the optical connector may be inserted into a coupling housing. The coupling housing is configured to allow two identical optical connectors to be inserted therein to provide an optical connection between two optical fibers terminated by ferrule assemblies within the optical connectors.

One of the advantages of the optical connector disclosed in '752 patent is that when the plug frame is inserted within the grip, the optical connector is provided with good side-loading characteristics due to the design of the grip and the manner in which the plug frame couples with the grip. One of the disadvantages associated with this optical connector is that, once the grip is installed, it cannot be removed. This is a disadvantage if, for some reason, tuning must be re-adjusted. The coupling housing is adapted to receive the grip. Although it may be possible to insert the plug frame into the coupling housing even when the plug frame is not disposed within the grip, removing the plug frame from the coupling housing once it has been inserted would be difficult, if not impossible without a special tool, due to the fact that there is no mechanism for detaching the plug frame from the coupling housing once it has been inserted. Furthermore, if the plug frame is not disposed within the grip, the side-loading characteristics of the optical connector are diminished.

Another disadvantage of this optical connector is that it is possible for certain components of the optical connector to be improperly assembled during the assembly process. This can be seen with reference to FIG. 2 of the '752 patent. A cable retention member is adapted to receive a barrel and spring of the ferrule assembly during the assembly process. The cable retention member includes a collar which is chamfered such that when the cable retention member is inserted within the plug frame, the side portions of the collar are received within windows of the plug frame. However, the plug frame has a cylindrical, or annular, opening that does not include any type of keying mechanism for ensuring that the side portions of the collar are received within the windows of the plug frame. Consequently, it is possible for the cable retention member to be pressed into the plug frame in such a manner that the side portions of the collar do not align with the windows. However, even if the side portions of the collar do not align with the windows, the cable retention member will be locked into place within the plug frame via a friction fit that makes it difficult, if not impossible, for the cable retention member to be removed from the plug frame. Therefore, improper assembly of the optical connector is possible if measures are not taken to ensure proper alignment of the cable retention member with the plug frame during assembly.

The improper assembly of the cable retention member within the plug frame prevents the optical connector from having a side-loading capacity that is as great as it would be if the side portions of the collar were properly seated within the windows of the plug frame. Also, once the cable retention member has been improperly inserted into the plug frame, it is difficult, if not impossible, to properly couple the plug frame with the grip, which will make it difficult, if not impossible, to couple the optical connector to the coupling housing in order to enable the ends of two optical fibers to be optically coupled together.

Another known design of an optical connector is shown in U.S. Pat. No. 5,481,634 (hereinafter the '634 patent). This connector utilizes a two-piece housing assembly comprising a housing and a cover, which are ultrasonically bonded together after a ferrule and its associated components have been installed within the housing. The associated components comprise a fiber-holding structure that includes the ferrule, a base member and a spring that is disposed about the base member. The housing is a generally U-shaped device having a cavity for receiving the fiber-holding structure. Once the fiber-holding structure has been inserted into the cavity of the housing, the cover is bonded thereto. The cover includes pins that mate with holes in the housing for alignment. Once joined together by the pins and associated holes, the front end of the connector has a generally square shape that fits into a receptacle that is shaped to receive the connector. The connector has a spring latch molded thereto that includes a living hinge, which allows a tab to be moved up and down in a direction that is generally perpendicular to the axial passageway of the fiber-holding structure. The spring latch is used for securing the connector to the receptacle in order to prevent unintended decoupling of the connector and the receptacle.

The housings of optical connectors, such as those discussed above, are often comprised of either polycarbonate or polyetherimide (PEI). For example, the '752 patent discloses that the plug frame of the connector may be comprised of polycarbonate. Both of these polymers have certain desirable properties. For example, polycarbonate is a relatively strong material that has good side-loading characteristics. Side-loading is usually applied by pulling the cable behind the connector; testing is typically done at 90° to the fiber axis. Optical connectors must withstand at least a certain minimum amount of side-loading in order to operate properly. As is well known in the art, when optical fibers are bent beyond a particular bending radius, undesirable signal loss or attenuation occurs. Therefore, an optical connector needs sufficient side-loading capability in order to prevent the optical fibers housed therein from being bent beyond an allowable bending radius. Optical connectors comprised of polycarbonate tend to have relatively good side-loading characteristics. Polycarbonate is also relatively inexpensive, which is also an advantage of using polycarbonate with optical connectors.

Although PEI is stronger than polycarbonate, polycarbonate is more flexible than PEI. Flexibility is an important and desirable property because it can enhance the life of the connector, or of particular features of the connector. For example, if the portion of the connector disclosed in the '634 patent having the living latch thereon and the latch itself were comprised of PEI, the latch, when bent a number of times, will fracture sooner than if it were comprised of polycarbonate. Since latches are intended to be flexed in order to decouple the connector from an associated receptacle or adapter, the ability of the latch to be flexed a number of times without breaking is important. However, there is another advantage of using PEI for the connector; it has superior chemical resistance to anaerobic adhesives and primers, which are often used to attach an optical fiber to the ferrule in private networks; and PEI has superior environmental performance (e.g., temperature and humidity tolerance) compared to polycarbonate.

Prior art connectors have also used two-piece housings wherein the extender cap and plug body are snapped together mid-span. In this design, PEI housings have been used due to the chemical resistance of PEI and its superior strength performance. However, as noted earlier, PEI has certain undesirable properties, such as stiffness and lower flexibility, which are undesirable for the latch feature. Polycarbonate was not chosen for use with this design because of its poor chemical resistance to anaerobic adhesives and primers, although the associated flexibility of a latch made of polycarbonate would have been acceptable.

Since PEI is less flexible and stronger than polycarbonate, it has greater side-loading capability than polycarbonate, but it is more susceptible than polycarbonate to fracturing or breakage due to bending or flexing. Therefore, if the living latch disclosed in the '634 patent were made of PEI, the latch could not be bent or flexed as many times as a latch comprised of polycarbonate before breaking. For these and other reasons, polycarbonate generally is not suitable for use with optical connectors. Polycarbonate is, however, widely used in connection with telephone jacks, which is an area of technology in which anaerobic adhesives are normally not used.

Other desirable properties of materials that are used for making optical connectors include low sensitivity to molding parameter variations and the ability of the material to knit well. When the housings of optical connectors are molded, the material of which they are molded typically flows into the mold cavity around and through various gaps and paths and rejoins. Rejoining of the plastic flow fronts is commonly referred to as knitting. At locations where the material rejoins, seams are sometimes formed as the material solidifies. These seams can be susceptible to stress such that stress applied to the knit line can result in fracture. Therefore, it is important that the optical connector be comprised of a material that has good knitting properties. PEI generally has relatively poor knitting properties, which, of course, is an undesirable property of PEI in relation to its use with optical connectors.

If a material has a high sensitivity to molding parameters, e.g., the temperature of the mold, the temperature of the melt, the speed at which the mold is filled, etc., then a failure to adequately control one or more of the molding parameters will likely result in poor quality of the end product. Therefore, it is desirable to make optical connectors out of a material that has a relatively low sensitivity to molding parameters so that variations in one or more of the molding parameters outside of their optimum values, or ranges of values, will not necessarily result in an end product of poor quality.

Accordingly, a need exists for an optical connector that is comprised of a material that provides the connector with good side-loading and flexibility characteristics, good chemical resistance, good environmental performance over a wide range of temperature and humidity ranges, and that has desirable knitting properties and relatively low sensitivity to molding parameters.

SUMMARY OF THE INVENTION

The present invention provides an optical connector having a housing comprised of polyphenylsulfone (PPSU). PPSU has several characteristics that make it suitable for use with optical connectors, including good flexibility, low sensitivity to molding parameters, good environmental performance and compatibility with anaerobic adhesives, which are often used to attach the optical fiber to the ferrule in private networks.

The optical connector preferably comprises a one-piece housing, a ferrule assembly and an insert. The insert has a keying mechanism formed thereon that is adapted to mate with a keying mechanism formed in the housing. The housing has a first opening formed therein that receives the ferrule assembly and the insert and a second opening opposite the first opening. The end of the ferrule assembly that holds an end of an optical fiber protrudes through the second opening. During assembly of the connector, the ferrule assembly is inserted into the housing followed by a compression spring and then the insert is inserted into the housing and secured to the housing to thereby secure the ferrule assembly within the housing and prevent the ferrule assembly and the insert from being inadvertently decoupled from the housing. The keying mechanisms of the insert and of the housing secure the insert to the housing.

In accordance with an exemplary embodiment of the present invention, the insert has a flange thereon that has two oppositely located flat surfaces and two oppositely located keys. The keys of the insert form the locking mechanism of the insert. The keys each have a chamfered surface. The keys and the flat surfaces of the flange provide the flange with a substantially rectangular cross-section. The first opening formed in the housing preferably has a substantially square cross-section. When the insert is inserted into the first end of the housing, the substantially square cross-section of the opening aligns with the oppositely located flat surfaces of the flange to thereby cause the keys of the flange to align with keyways formed in the surfaces of the housing. The keyways of the housing correspond to the locking mechanism of the housing.

The flange is slightly larger in size than the size of the first opening of the housing. Therefore, as the insert is inserted into the first opening of the housing, the chamfered surfaces of the keys deflect the sides of the housing outwardly. The keys of the insert are then received by the keyways formed in the housing to lock the insert into place within the housing. Once the keys have been received within the keyways, the major stress on the housing is relieved. The housing has slots formed in two opposing surfaces thereof, which are transverse to the surfaces of the housing in which the keyways are formed. The slots allow the housing to deflect outwardly as the insert is inserted into the housing.

These and other features and advantages of the present invention will become apparent from the following description, drawings and claims.

DETAILED DESCRIPTION OF THE INVENTION

Figure 1:
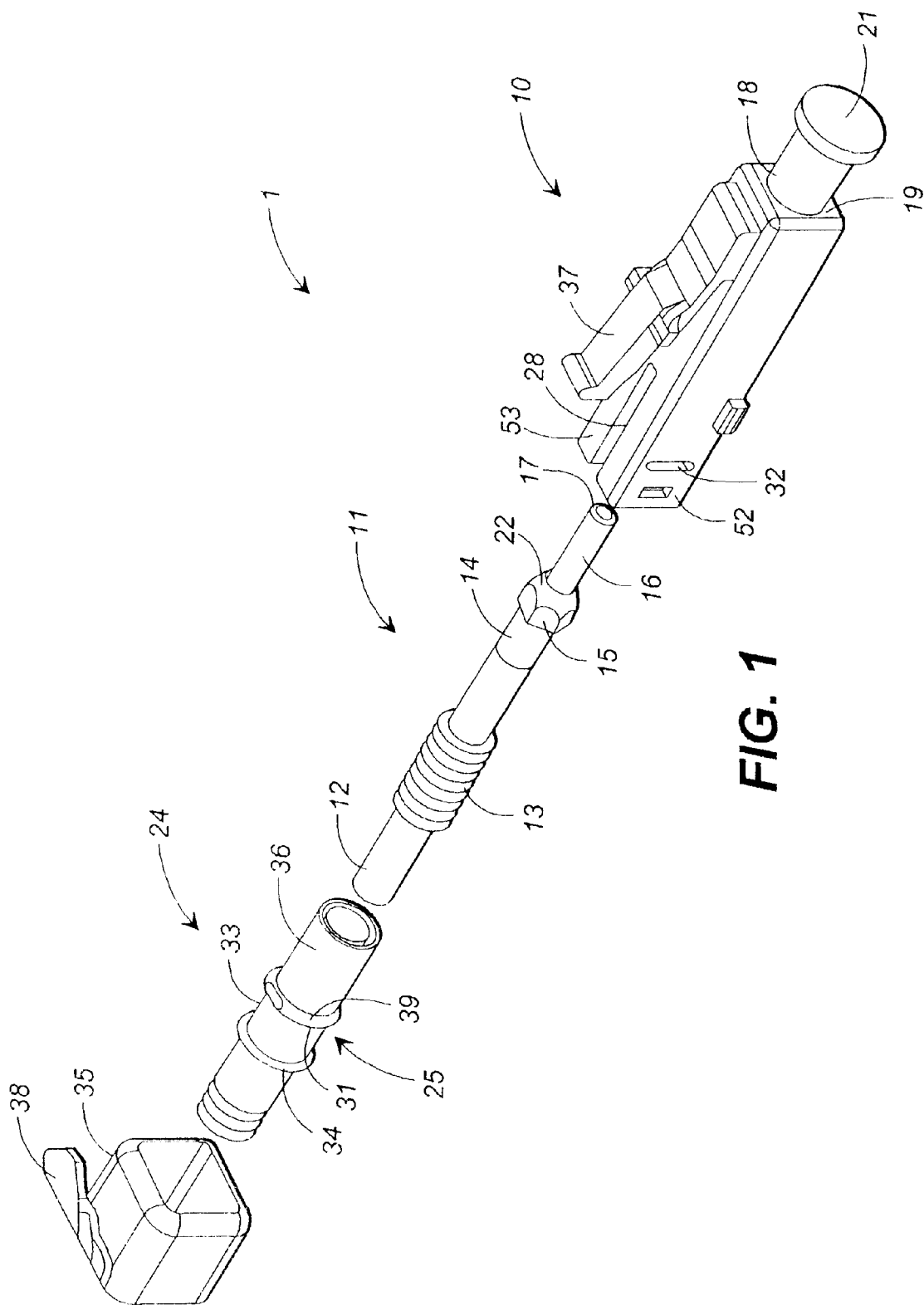
FIG. 1 is a perspective view of the components of the optical connector of the present invention having a protective cover thereon, which is shown prior to assembly of the optical connector.

In accordance with the present invention, it has been determined that polyphenylsulfone (PPSU) has properties that make it surprisingly suitable for use in fabricating optical connectors. As discussed below in detail, extensive tests were performed to determine whether or not this material was suitable for use with optical connectors. Some of the experimental data relating to these tests is shown in the figures and discussed herein. The results of these tests show that PPSU has several properties that make it suitable for use with optical connectors, including good flexibility, adequate side-loading capability, excellent chemical resistance, good environmental performance over a wide range of temperatures and humidities (e.g., −40° C. to 85° C° and 95% relative humidity at 70° C.), low sensitivity to molding parameters and the ability of the material to have good knit line properties. In accordance with the preferred embodiment of the present invention, a brand of PPSU manufactured by BP-Amoco Polymers, Inc. known as RADEL® R is utilized to fabricate the optical connector of the present invention.

There are also a few undesirable aspects to using PPSU with optical connectors, such as the relatively high cost of PPSU in comparison to the cost of PEI and less side-loading capability than that associated with PEI. However, in accordance with the present invention, it has been determined that the advantages of fabricating optical connectors, or portions thereof, out of PPSU far outweigh the disadvantages thereof, as will become apparent from the following discussion.

The good flexibility properties of PPSU produce both desirable and undesirable results. On one hand, a large amount of flexibility is desirable because it increases the life of parts of the connector that are intended to flex or bend, such as the latch that is often provided on optical connectors to enable them to be coupled to and decoupled from an adapter. On the other hand, a large amount of flexibility in a housing of an optical connector may, all other things being equal, decrease the side-loading capability of the housing. However, although the side-loading capability of optical connectors fabricated using PPSU may be somewhat less than that associated with using other types of materials, such as PEI, for example, it has been determined that an optical connector can be designed to have a structure that compensates for the greater flexibility in order to provide it with good sideloading characteristics.

For example, it has been determined that the housing of the optical connector may be comprised of a one-piece housing rather than a two-piece housing. In the past, optical connectors have included housings that are comprised of two or more pieces. Larger optical connectors inherently have larger section moduli that are more able to withstand side-loading. Small form factor (SFF) connectors, however, made of multiple-piece housings typically have thinner walls and a lower section modulus. Therefore, SFF connectors that are comprised of these types of housings are susceptible to stress at the locations where the pieces of the housings are joined together, and other steps must be taken to ensure that they have adequate side-loading capability. One step that can be taken to ensure that these connectors have adequate side-loading capability is to fabricate them with stronger, stiffer materials, i.e., materials that are less flexible. However, doing so may result in a connector having the aforementioned undesirable properties associated with too much stiffness.

In accordance with the present invention, the optical connector preferably is comprised of a one-piece housing. Providing the optical connector of the present invention with a one-piece housing allows the optical connector to be comprised of PPSU so that the optical connector can benefit from the associated greater flexibility without sacrificing side-loading capability, while also providing excellent resistance to a wide range of environmental factors, such as temperature and humidity, without substantial degradation. However, the present invention is not limited to the one-piece housing configuration described herein. Those skilled in the art will understand that an optical connector comprised of PPSU can be provided with other structural features that ensure that it will have desirable side-loading capability.

For example, a well-known behind-the-wall (BTW) optical connector as is commercially available from Lucent Technologies, is Model No. P1101A-Z-125. This connector has been designed for smaller (e.g., 0.9 mm diameter) buffered fiber. This connector comprises a short, molded plastic extender cap. High strength generally is not an issue with this BTW connector. However, the ability to withstand anaerobic adhesive and catalysts, good environmental performance, and good flexural characteristics is important. Consequently, PPSU is a suitable material for this connector.

Therefore, the optical connector described herein should be construed as an example of an optical connector that may be comprised of PPSU. The description of the optical connector provided herein is merely intended to demonstrate the preferred embodiment of the present invention and to provide an example of one possible implementation of the present invention. Those skilled in the art will understand that the present invention applies to any optical connector that is comprised, in whole or in part, of PPSU.

Before discussing the various properties of PPSU and the characteristics of optical connectors comprised thereof, a detailed description of an optical connector that may be comprised, in whole or in part, of PPSU will be described below with reference to FIGS. 1–6B. FIG. 1 is a perspective view of the optical connector of the present invention in accordance with the preferred embodiment. The optical connector 1 comprises a one-piece housing 10 that is designed to receive a ferrule assembly 11. The ferrule assembly 11 comprises a flexible tube 12 through which an optical fiber (not shown) passes, a stainless steel barrel 14 having a hexagonally-shaped tuning portion 15 disposed on an end thereof, and a ferrule 16. When the ferrule assembly 11 is disposed within the one-piece housing 10, the ferrule 16 protrudes through an opening 18 formed in a forward end 19 of the one-piece housing 10. The opening 18 is adapted to allow a protective cover 21 to be removably attached thereto, which covers and protects the ferrule 16. Therefore, the cover 21 is not comprised by the one-piece housing 10. The cover 21 is not a necessary element of the optical connector 1.

The tuning portion 15 preferably is integrally formed on a forward end of the barrel 14. The ferrule 16 is press fit within the tuning portion 15 to prevent movement of the ferrule 16 with respect to the tuning portion 15 and the barrel 14. One function of the barrel 14 of the ferrule assembly 11 is that it provides an interior surface for attachment of the fiber buffer (not shown). During assembly, an adhesive, such as epoxy, for example, is inserted into the barrel 14 by means of a syringe. The optical fiber having the buffer thereon passes through the tube 12, which preferably is comprised of a brand of fluorinated ethylene propylene available from E. I. duPont de Nemours, Inc. known as Teflon®. The buffer is then adhered to the barrel 14 by the adhesive. The barrel 14 has a tapered end (not shown) that is press fit into an end of the tube 12. This press fit prevents movement of the barrel 14 with respect to the tube 12. The ferrule 16 has a narrow passageway through its central axis for receiving an end portion of an optical fiber (not shown).

A compression spring 13 of the optical connector 1 is disposed about the tube 12 and enables the ferrule 16 of the ferrule assembly 11 to be moved back and forth in the axial direction of the ferrule 16 within the opening 18. An end face 17 of the ferrule 16 comprises a polished surface that abuts an end face of another ferrule (not shown) when the optical connector 1 is disposed in an adapter (not shown) that optically couples the optical fiber disposed within the ferrule 16 with another optical fiber (not shown) of another optical connector (not shown) that is also disposed within the adapter. Alternatively, the ferrule end face 17 can abut a device stop (not shown) in a device receptacle (not shown), as will be understood by those skilled in the art.

When the ferrule assembly 11 is disposed within the one-piece housing 10, the tuning portion 15 is seated within a recess formed in the housing 10. The recess has a hexagonal shape, or cross-section, with dimensions designed to receive the hexagonally-shaped tuning portion 15 and prevent it from rotating. The recess will be discussed in more detail below with reference to FIG. 4. As stated above, the tuning portion 15 is securely attached to the ferrule 16, thereby preventing relative movement between the tuning portion 15 and the ferrule 16.

The tuning portion 15 has slots 22 formed in opposite sides thereof that are adapted to receive a tool (not shown) that is used for tuning the eccentricity associated with the optical fiber and the ferrule 16. Only one of the openings 22 can be seen in FIG. 1. The eccentricity may be tuned after the ferrule assembly 11 has been disposed within the one-piece housing 10, ie., after the optical connector 1 has been assembled, including installation of the fiber (not shown). In order to tune the eccentricity after the optical connector 1 has been assembled, a tool (not shown) is inserted through the opening 18 formed in the forward end 19 of the one-piece housing and into the openings 22 formed in opposite sides of the tuning portion 15. The tool is then pushed inwards, causing the tuning portion 15 to further push against the spring 13 and lift out of the hexagonally-shaped recess of the housing 10. While the tuning portion 15 is disposed outside of the hexagonally-shaped recess of the housing 10, the tool may be used to provide a rotational force to the tuning portion 15 that causes the tuning portion 15, and the ferrule 16 attached thereto, to rotate. When the tool is removed from the opening 22, the spring 13 forces the tuning portion 15 back into the hexagonally-shaped recess, which prevents the tuning portion 15, and the ferrule 16 that is attached thereto, from rotating. The tuning portion 15 preferably has six sides to enable the tuning portion to be oriented within the hexagonally-shaped recess in six different rotational orientations.

Once the ferrule assembly 11 and the spring 13 disposed about the ferrule assembly 11 have been placed in the one-piece housing 10, an insert 24 that has an inner diameter that is slightly larger than the outer diameter of the tube 12 is inserted over the back end of the tube 12 and placed in contact with an end of the compression spring 13. The insert 24 acts as a strength member and holds the ferrule assembly 11 in place within the one-piece housing 10, while also enhancing the side-loading capacity of the optical connector 1. The insert 24 has a flange 25 and a stop 34 disposed thereon. The flange 25 is comprised of two oppositely located flat sides 33-33 and two oppositely located chamfered, or beveled, surfaces 39-39, which provide the flange 25 with a substantially rectangular-shaped cross-section. A cylindrical portion 36 of the insert provides the insert with an extended length. Only one of the flat sides 33 and one of the chamfered surfaces can be seen in FIG. 1.

Figure 2A:
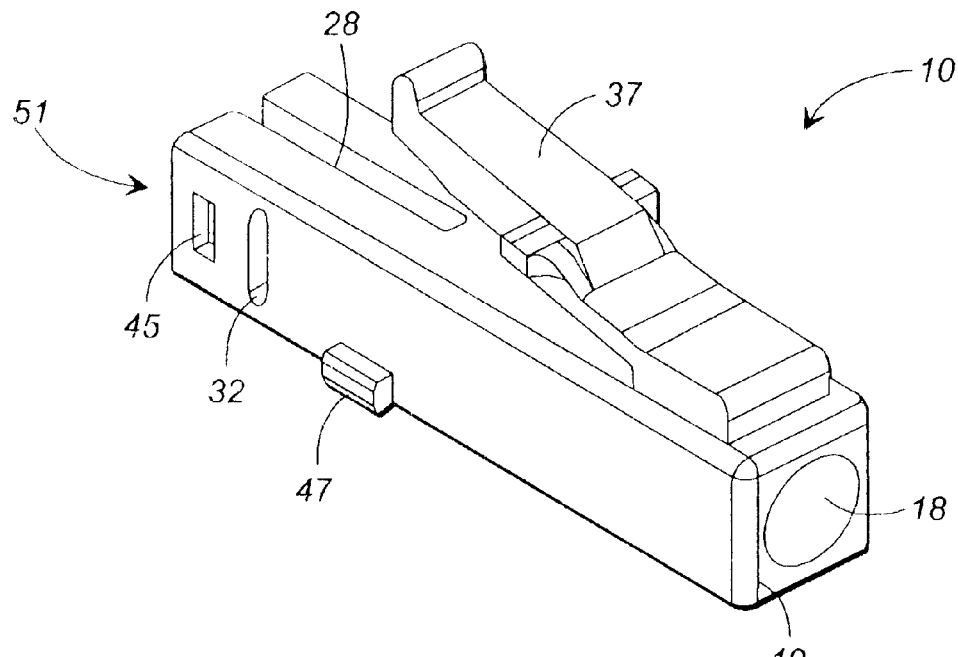
FIG. 2A is a top, perspective view of the one-piece housing of the optical connector of the present invention shown in FIG. 1.
Figure 2B:
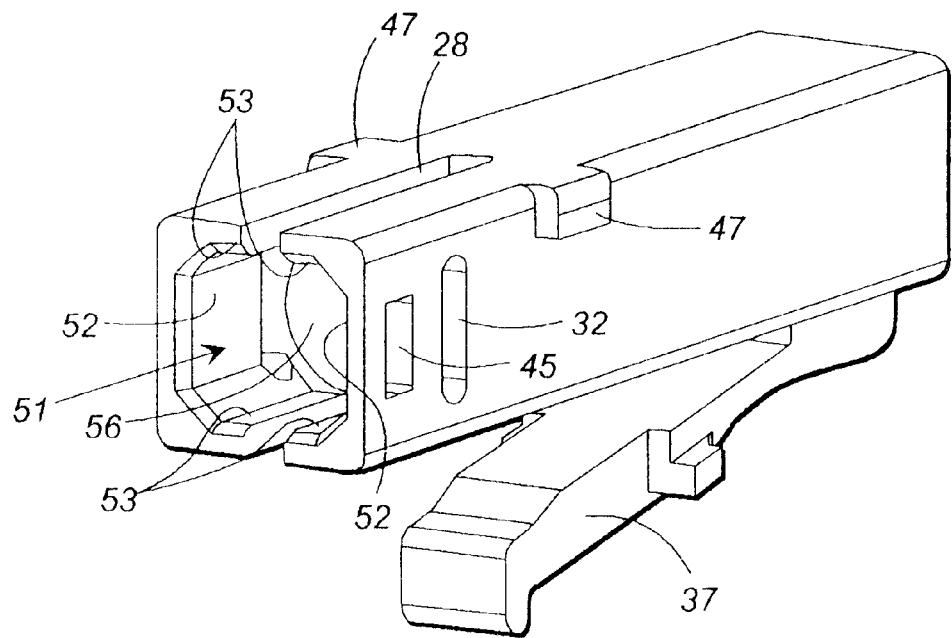
FIG. 2B is a bottom, perspective view of the one-piece housing of the optical connector of the present invention shown in FIG. 1.

FIGS. 2A and 2B illustrate top and bottom perspective views, respectively, of the one piece housing 10 of the optical connector 1 of the present invention shown in FIG. 1. The one-piece housing 10 has a substantially square-shaped opening 51 defined by side surfaces 52-52 and top and bottom surfaces 53-53 at the back end of the housing 10. The substantially square opening 51 formed in the back end of the one-piece housing 10 is followed in the housing 10 by an annular cylindrical portion 56 that is slightly larger than the cylindrical portion 36 of the insert 24. The portion 36 of the insert 24 enters the opening 51 formed by the surfaces 52-52 and 53-53 at the back end of the housing 10 and the chamfered surfaces 39-39 of the keys 31-31 push the surfaces 52-52 outwards causing the back end of the one-piece housing 10 to be flexed outwardly. The keys 31-31 are guided in the proper orientation by the flat surfaces 33-33 of the flange 25. Identical slots 28 located in the top and bottom surfaces 53-53 of the one-piece housing 10 allow the one-piece housing 10 to flex outwardly to accommodate the keys 31-31 of the flange 25.

The opening 51 in the back end of the one-piece housing 10 allows the insert 24 to be pressed therein in two different orientations, which are 180° apart from one another. This feature of the optical connector 1 is extremely advantageous during assembly of the optical connector 1 because it allows the insert 24 to be quickly aligned with the opening in the back end of the one-piece housing 10. As the insert 24 is pressed into the housing 10, the square shape of the opening formed in the housing 10 causes the keys 31-31 of the flange 25 to line up with keyways 32-32 formed in the side walls 52-52 of the housing 10, thereby ensuring proper alignment of the insert 24 and the housing 10. Once the insert 24 has been pressed into the one-piece housing 10, the keys 31-31 are received in keyways 32-32 and the major stress is relieved in the housing 10. The mating of the keys 31-31 of the flange 25 with the keyways 32-32 of the one-piece housing 10 locks the insert 24 in place within the one-piece housing 10 and prevents the ferrule assembly 11 and the insert 24 from inadvertently being decoupled from the one-piece housing 10.

Once the insert 24 has been assembled over the ferrule assembly 11 and has been locked into place within the one-piece housing 10, a yoke 35 may be placed over the back end of the one-piece housing as shown. Slots 45 formed in opposite sides of the one-piece housing 10 mate with projections (not shown) formed on the yoke 35 to enable the yoke 35 or an end cap (not shown) to be securely attached to the one-piece housing 10.

The one-piece housing 10 has a "living" latch 37 located thereon that comes into contact with a trigger 38 disposed on the yoke 35. When the optical connector 1 is placed in an adapter (not shown) for optically coupling light from two optical fibers together, the latch 37 functions to lock the optical connector in place within the adapter. The optical connector 1 may be removed from the adapter by depressing the trigger 38 of the yoke 35, which causes the latch 37 to be pressed in a downward and forward direction, thereby unlocking the optical connector 1 from the adapter.

As discussed below in detail, fabricating the housing 10, including the latch 37, from PPSU provides the latch with extremely good flexibility, which enhances the life of the latch 37. The yoke 35 and trigger 38 may also be made of PPSU, or of some other suitable material, such as nylon, for example. Nylon generally has excellent flex characteristics, but poor strength and poor resistance to permanent deformation, which is not an issue with respect to the trigger 38, but could be an issue with respect to the latch 37. PPSU could be used to provide the trigger 38 with very good flexibility and, consequently, would provide the trigger 38 with a longer life.

Stops 47 located on each side of the one-piece housing 10 abut the front end of the yoke 35 when the yoke 35 is inserted over the back end of the one-piece housing 10 and is locked into place. It should be noted that the yoke 35 is not a necessary component of the optical connector 1, but may be added for convenience in order to enable a user to easily decouple the optical connector 1 from an adapter. As will be understood by those skilled in the art, the trigger may be molded onto the housing 10 such that it is an integral part of the housing 10. Even in the absence of a yoke having a trigger or a trigger formed on the housing 10, the optical connector 1 can be decoupled from an adapter by the user simply using his or her fingernail to depress the latch 37. Alternatively, an end cap (not shown) may be placed over the end of the housing 10 rather than the yoke 35, or the end of the housing 10 may have nothing attached to it other than the insert 24. The end cap would be substituted for the insert 24. In this case, the end cap would have keys thereon that mate with the keyways 32-32 of the housing 10. This would also be the case with the aforementioned BTW connector FIG. 2B illustrates the opening 51 formed in the back end of the one-piece housing 10. As stated above, the opening 51 is slightly smaller in size than the major diameter of the keys 31-31 of the flange 25 such that, when the insert 24 is inserted into the housing 10, the tapered surfaces 39-39 of the keys 31-31 of the flange 25 force the sides of the housing outwards. Also, the opening 51 has a substantially square cross-section so that the opening 51 will be guided by surfaces 33-33 of the flange 25 in such a manner that the keys 31-31 of the flange 25 are aligned to be received within the keyways 32-32 formed in the sides of the housing 10.

During an automated assembly process, many optical connectors are assembled in rapid succession. When the inserts 24 are aligned for assembly by a vibratory feeder (not shown), the inserts 24 are suspended by their stops 34 so that the cylindrical portion 36 of the insert 24 points downward on a track that accepts the diameter of the cylindrical portion 36 and aligns on flat surfaces 33-33. The inserts 24 are then placed within the openings 51 and aligned with the openings 51. When the insert 24 is pressed into the opening 51, the substantially square cross-section of the opening 51 formed by the surfaces 52-52 and 53-53 will cause the flat surfaces 33-33 of the keys 31-31 of the flange 25 to align with the keyways 32-32.

Figure 3A:
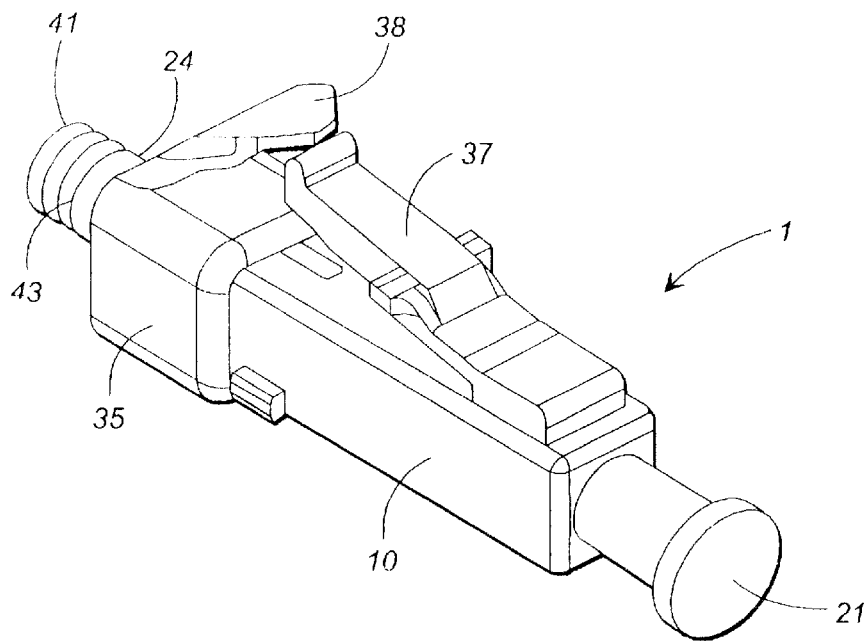
FIG. 3A is a perspective view of the optical connector of the present invention shown in FIG. 1 after the components of the optical connector have been assembled.

Once the optical connector 1 has been assembled, the optical connector 1 has the appearance shown in FIG. 3A. The optical connector 1 shown in FIG. 3A is shown as having the yoke 35 attach thereto. An end 41 of the insert 24 is adapted to have strength members, such as, for example, aramid fibers, of an optical fiber cable attach thereto. The strength members are attached by, for example, a crimping device (not shown) to a circumferential groove 43 formed in the end 41 of the insert 24. The crimping device may be a crimping sleeve of the type commonly used for attaching strength members to optical connectors. The manner in which the strength members of an optical fiber cable may be secured to the insert 24 is well known to those skilled in the art. Attachment of the strength members to the insert 24 causes forces applied to the optical fiber cable to be distributed via the strength members to the insert 24, thereby preventing the forces from being applied directly to the optical fiber or to the ferrule assembly.

Figure 3B:
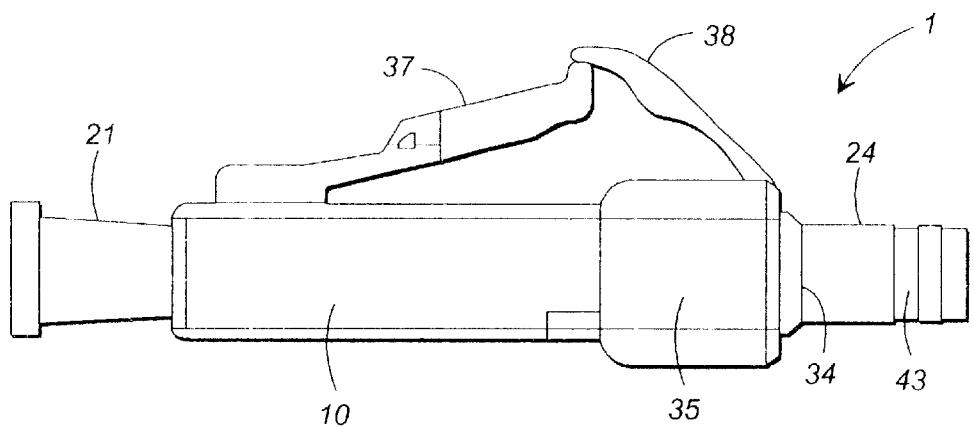
FIG. 3B is a side, plan view of the optical connector of the present invention shown in FIG. 1 after the components of the optical connector have been assembled.

FIG. 3B is a side, plan view of the optical connector 1. Again, the optical connector 1 of the present invention is shown as having the yoke 35 attached thereto merely for illustrative purposes. FIG. 3B illustrates the preferred dimensions of the one-piece housing 10 of the present invention. Although the one-piece housing 10 of the optical connector 1 is not limited to any particular dimensions, the length of the one-piece housing 10 preferably is selected to assist in the side-loading capability of the one-piece housing 10. Preferably, the one-piece housing 10 is 0.775 inches, or 19.68 millimeters (mm), in length.

A stop 34 disposed on the insert 24 behind the flange 25 is larger in diameter than the opening formed in the back end of the one-piece housing 10. The stop 34 abuts the back end of the one-piece housing 10 when the insert 24 is fully inserted into the one-piece housing 10 and the keys 31-31 are engaged in the keyways 32-32. The mating of the keys 31-31 of the flange 25 within the keyways 32-32 of the one-piece housing 10 prevents the insert 24 from rotating once the insert 24 has been locked into place within the one-piece housing 10. The key 31 and keyway 32 assist in minimizing twisting of the strength members attached to the circumferential groove 43 of the insert 24, which, in turn, assists in preventing the optical fiber of the optical fiber cable from twisting.

Figure 4:
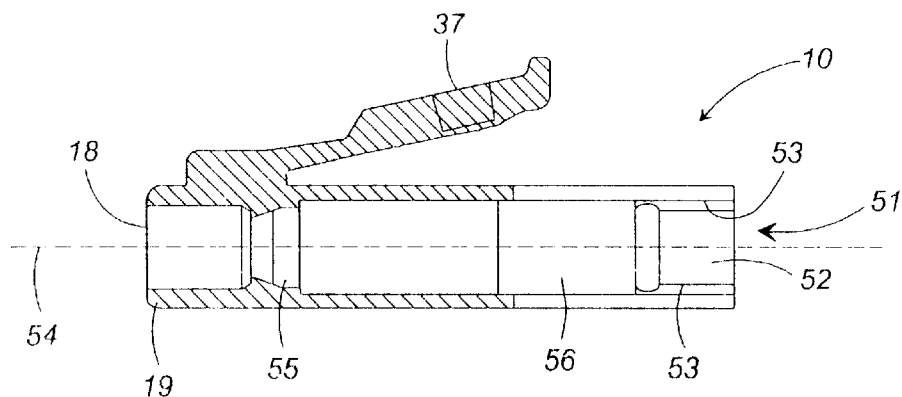
FIG. 4 is a side, cross-sectional view of the one-piece housing of the optical connector of the present invention shown in FIGS. 1–2B.

FIG. 4 is a side, cross-sectional view of the one-piece housing 10 of the optical connector 1 of the present invention. The view shown in FIG. 4 shows the hexagonally-shaped recess 55 defined within the housing 10. FIG. 4 also shows the annular cylindrical portion 56 of the housing 10 that follows the opening 51 formed in the end of the housing 10. As stated above this portion receives the cylindrical portion 36 of the insert 24. The tuning portion 15 of the ferrule assembly 11 shown in FIG. 1 is seated within the hexagonally-shaped recess 55 when the ferrule assembly 11 is disposed within the housing 10. An end of the spring 13 of the ferrule assembly 11 abuts the tuning portion 15 and is disposed adjacent the hexagonally-shaped recess 55. As stated above, the tuning portion 15 enables the eccentricity of the optical fiber to be tuned after the optical connector 1 has been assembled. However, it should be noted that the tuning portion 15 is not a necessary component of the optical connector 1 of the present invention. Those skilled in the art will understand that other techniques and devices for tuning the eccentricity of the optical fiber may be used with the optical connector 1 of the present invention.

Eccentricity is defined as the distance between the centroidal axis of the ferrule at an end face of the ferrule and the centroidal axis of the optical fiber core held within the passageway of the ferrule. Generally, the passageway is not concentric with the outer cylindrical surface of the ferrule, which is the reference surface. Also, the optical fiber may not be centered within the ferrule passageway and the fiber core may not be concentric with the outer surface of the fiber. Hence, the eccentricity is comprised of the eccentricity of the optical fiber within the ferrule passageway and the eccentricity of the passageway within the ferrule. The eccentricity can be tuned by rotating the tuning portion 15 to a rotational orientation that provides the best optical coupling of the optical fiber cores. The hexagonally-shaped tuning portion 15 and the hexagonally-shaped recess 55 formed in the housing 10 allow the ferrule 16 to be placed in any one of six different rotational orientations in order to tune the eccentricity of the optical fiber core with reference to the ferrule 16. Since the eccentricity can be tuned after the optical connector 1 has been assembled, it is not necessary to disassemble the optical connector in order to optimize the position of the ferrule subassembly/fiber core.

However, it should be noted that the optical connector 1 may instead utilize a ferrule assembly that is tuned for eccentricity prior to assembly of the optical connector. Those skilled in the art will understand that a variety of ferrule assemblies are suitable for this purpose. Therefore, those skilled in the art will understand that the present invention is not limited to using the ferrule assembly 11 shown in FIG. 1. An example of a ferrule assembly other than that shown in FIG. 1 that is suitable for use with the optical connector of the present invention is disclosed in U.S. Pat. No. 5,481,634, which is commonly assigned to the assignee of the present application and which is incorporated by reference herein in its entirety. Those skilled in the art will also understand that the present invention applies to untuned connectors as well.

Figure 5:
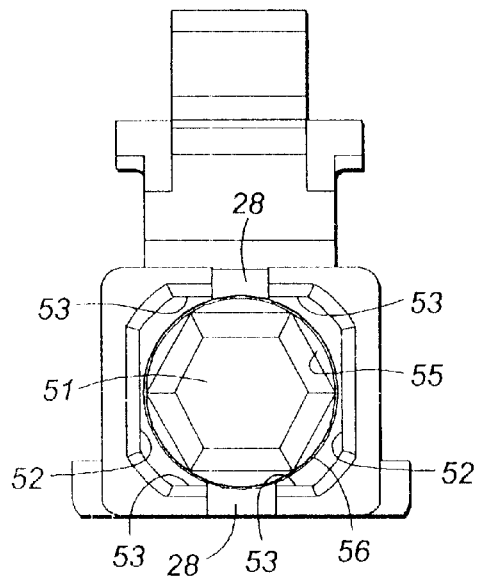
FIG. 5 is a rear, plan view of the one-piece housing of the optical connector of the present invention shown in FIGS. 1–2B.

FIG. 5 is a rear view of the one-piece housing 10 of the optical connector 1. The hexagonally-shaped recess 55 defined within the housing 10 can be seen from the rear view shown in FIG. 5. The view shown in FIG. 5 also shows the slots 28-28 formed in the top and bottom surfaces 53-53 of the housing 10. The side surfaces 52-52 and the top and bottom surfaces 53-53 define the sides of the opening 51. As stated above, the opening 51 defined by the surfaces 52-52 and 53-53 at the back end of the housing 10 is forced open by the keys 31-31 such that when the insert 24 is pressed into the housing, the flange 25 pushes the sides 52-52 of the housing 10 in an outward direction. The slots 28 enable the sides 52-52 of the housing 10 to deflect outwardly. During insertion of the insert 24 and just prior to the keys 31-31 of the flange 25 being received within the keyways 32-32 of the housing 10, the side walls 52-52 of the housing 10 are at a maximum degree of deflection. When the keys 31-31 are positioned in the keyways 32-32, the side walls 52-52 return to an ideal, substantially low-stress condition.

The insert 24 functions as a strength member and the combination of the insert 24 and the manner in which it couples with the housing 10 provides the optical connector 1 with optimum side-loading capability. The length of the slots 28 formed in the housing 10 have been selected to provide the housing 10 with a degree of outward deflection that is within acceptable load, or stress, limits. Preferably, the length of the slots is 0.290 inches, or 7.37 mm. Preferably, the width of the slots is 0.035 inches, or 0.89 mm. However, those skilled in the art will understand that the one-piece housing 10 of the present invention is not limited with respect to the dimensions of various features thereof, including those of the slots 28.

The tight coupling of the insert 24 with the housing 10 is a result of (1) the sliding fit of the cylindrical portion 36 of the insert 24 within the cylindrical portion 56 of the housing 10, (2) the containment of a substantial portion of the insert 24 within the housing 10, (3) the positioning of the stop 34 against the back end of the housing 10 when the keys 31-31 are locked within the keyways 32-32, and (4) the locking of the keys 31-31 within the keyways 32-32. The combination of these features provides the optical connector 1 with very good side-loading capability. Also, the strength of the insert 24 further enhances the sideloading capability of the optical connector 1. The insert 24 preferably is comprised of a metal material. Preferably, the insert 24 is comprised of aluminum, a nickel-plated brass alloy, or stainless steel. However, other materials are suitable for this purpose, as will be understood by those skilled in the art.

The insert 24 and the various structural features thereof must be capable of withstanding the loads and stresses that will be encountered by the insert 24. The insert 24 will encounter various loads and stresses in performing its functions. For example, when the insert 24 is inserted into the back end of the one-piece housing 10, the insert 24 will be stressed as it causes the sides of the housing 10 to flex outwardly. Once the insert 24 has been secured within the housing 10, bending stresses will be removed. However, stresses will be applied to the insert 24 and to the housing 10 when forces are applied to the optical fiber cable attached by strength members to the insert 24, as well as when forces are applied directly to the insert 24 or to the housing 10. Therefore, the insert 24 should be designed of a material that is suitable for handling the expected stresses and loads.

Figure 6A:
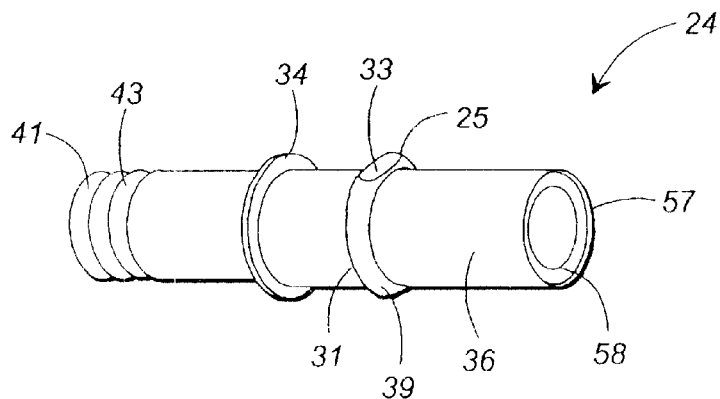
FIG. 6A is a side, perspective view of the insert of the optical connector of the present invention shown in FIG. 1 prior to assembly of the components of the optical connector.
Figure 6B:
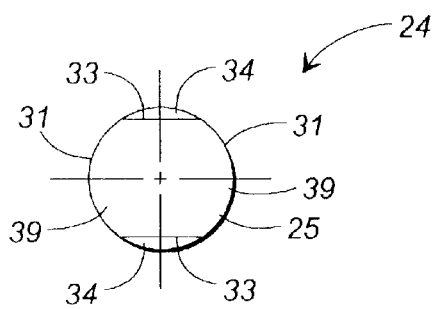
FIG. 6B is a front, plan view of the insert shown in FIG. 6A.

FIGS. 6A and 6B illustrate a side, perspective view and a front, plan view, respectively, of the insert 24. The insert 24 has a leading end with a circumferential ridge 57 and a circumferential ledge 58 that comes into contact with and aligns the spring 13 when the insert 24 is pressed against the spring 13 inside of the housing 10 in order to preload the spring 13. The keys 31-31 of the flange 25 have a diameter that is substantially identical to the diameter of the stop 34 located behind the flange 25. This can be clearly seen from the front, plan view shown in FIG. 6B. The stop 34 is larger than the opening 51 formed in the back end of the one-piece housing 10. The top and bottom flat surfaces 33-33 of the keys 31-31 of the flange 25 reduce the dimensions of the flange 25 in the vertical directions to a diameter that is equal to the diameter of the cylindrical portion 36 of the insert 24. When the keys 31-31 of the flange 25 are received within the keyways 32-32 of the housing 10, the stop 34, which is larger in diameter than the size of the opening 51, abuts against the back end of the housing 10.

Another advantageous feature of the present invention is that the design of the optical connector 1 eliminates the need to use insert molding. In the past, optical connectors have been fabricated by using insert molding to mold the plastic of the optical connector about the metal tube, or insert, to which the strength members (e.g., aramid fibers) are normally attached. Insert molding results in a portion of the optical connector encapsulating a portion of the metal tube, which prevents movement of the metal tube with respect to the housing. In accordance with the present invention, insert molding is not needed because when the keys 31-31 of the flange 25 are seated within the keyways 32-32 of the one-piece housing 10, the insert 24 is locked into position within the housing. This feature of the present invention facilitates the process of fabricating and assembling the optical connector 1 because insert molding is not required to fixedly attach the insert 24 to the housing 10.

As stated above, the housing 10 of the optical connector 1 of the present invention is comprised of a polymer known as PPSU, and preferably is comprised of a brand of PPSU known as RADEL® R, as mentioned previously. However, the present invention is not limited to using any particular type of PPSU to fabricate the housing of the optical connector. Also, as stated above, the present invention is not limited to using PPSU to fabricate the connector discussed above with reference to FIGS. 1–6B. Furthermore, although it is preferable that the entire housing assembly of the connector be comprised of PPSU, if desired, only a portion of the housing assembly can be fabricated from PPSU in order to provide that portion with certain desirable structural, environmental, and/or chemical properties.

PPSU has several characteristics that make it suitable for use with the present invention including (1) good flexibility, which enhances the life of the living hinge 37, (2) low sensitivity to molding parameters, which reduces the possibility that variations in the mold temperature and other mold process parameters will result in defects in the housing 10, (3) compatibility with anaerobic adhesives that are often used to attach the optical fiber to the ferrule in private networks, and (4) good environmental characteristics over a wide range of temperature and humidities. These properties will now be discussed with reference to FIGS. 7–9. For purposes of comparison, the properties of PPSU will be discussed in relation to the properties of PEI so that the extraordinary advantages of using PPSU to fabricate an optical connector can be demonstrated.

Figure 7:
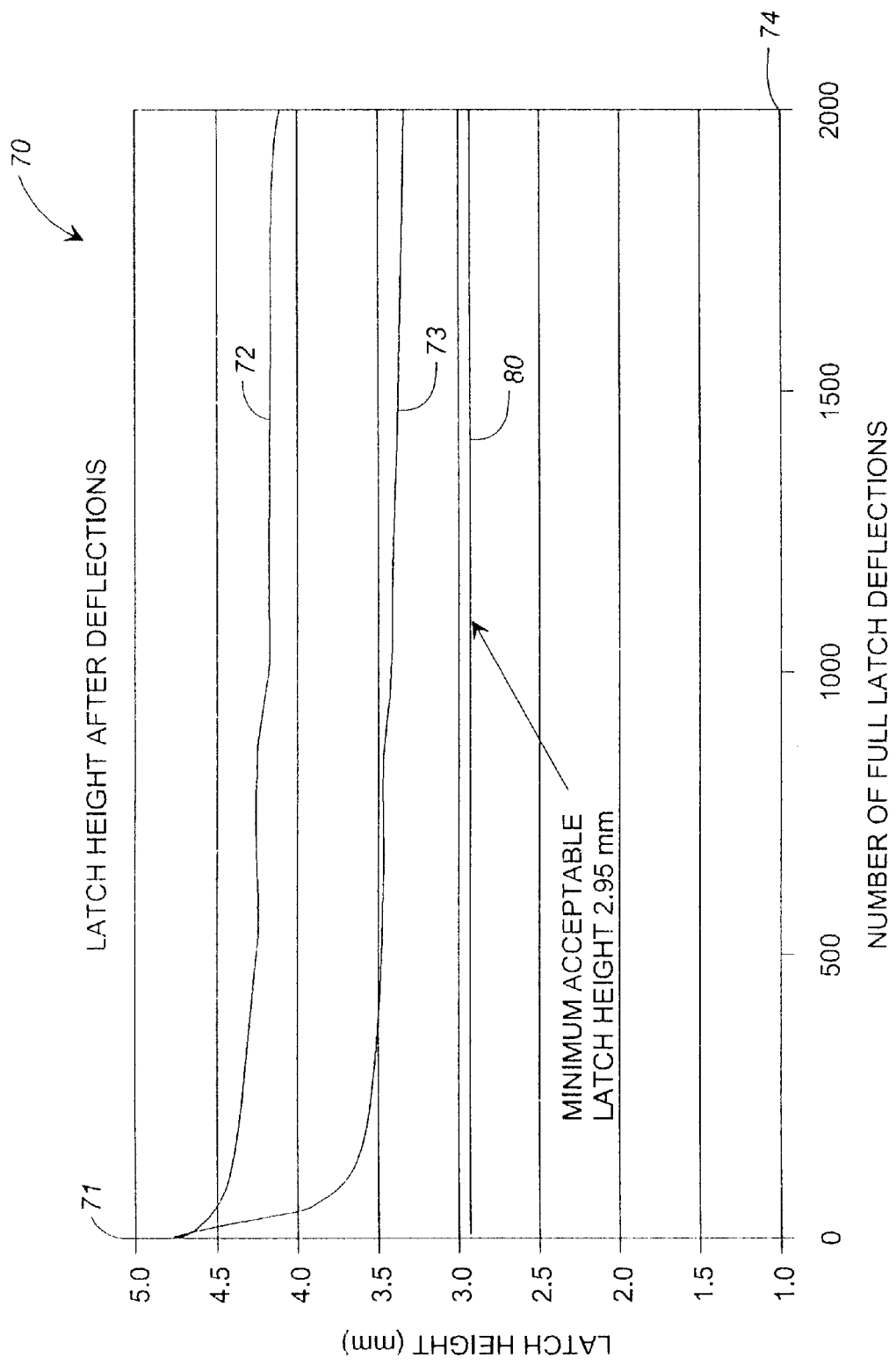
FIG. 7 is a graph illustrating the results of latch height and minimum acceptable permanent deformation relating to latch deflection tests performed on latches of housings comprised of PEI and latches of housings comprised of PPSU.

FIG. 7 is a graph 70 illustrating a latch deflection test that was performed on housing having a latch such as the latch 37 shown in FIG. 1. In this test, the latch was deflected downwards in the manner in which they would be deflected in order to decouple the housing from an adapter. The latch height is denoted in millimeters (mm) on the vertical axis 71. The number of deflections is shown on the horizontal axis 74. The graph 70 to after a particular number of deflections. The curve 72 represents averaged data for four housings fabricated of PEI. The curve 73 represents averaged data for four housings fabricated out of PPSU. The line 80 represents the minimum acceptable latch height needed for the latch to properly effect coupling with an associated adapter (not shown). The graph 70 demonstrates that PEI performed better than PPSU because the latches made of PEI returned heights closer to the starting heights than did those comprised PPSU. Therefore, latches made of PEI demonstrated better memory characteristics than did latches made of PPSU. However, the graph 70 also demonstrates that PPSU significantly exceeded the minimum requirement for the latch height of at least 2.95 mm, even after 2000 deflections.

Figure 8:
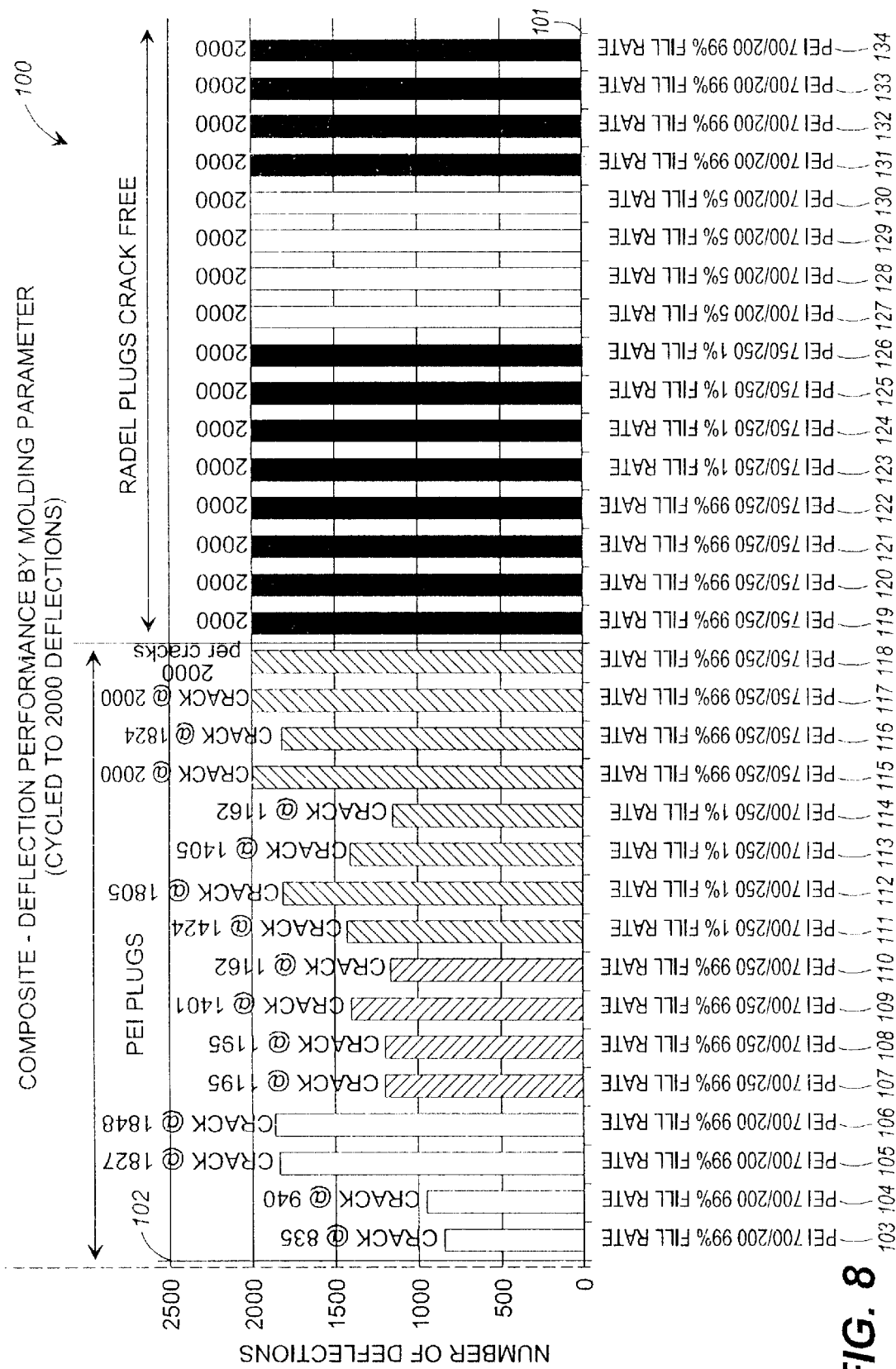
FIG. 8 is a graph illustrating the results of latch deflection tests performed on latches of housings comprised of PEI and latches of housings comprised of PPSU as a function of molding parameter variations.

FIG. 8 is a graph 100 illustrating the deflection performance of the latches of housings made of PEI and PPSU as a function of molding parameters. The horizontal axis 101 corresponds to the material and molding parameters used and the vertical axis 102 corresponds to the number of deflections of the latch. The heights of the vertical bars on the graph with respect to the vertical axis indicate the number of deflections that had been performed when the latch broke off or cracked, or to where the flex test was halted without failure. The first sixteen data entries 103–118 on the horizontal axis 101 correspond to cases where the housings were comprised of PEI. The second group of sixteen data entries 119–134 correspond to case where the housings were comprised of PPSU. For each set of molding parameters, four samples were randomly selected for testing; for instance data entries, 107 108, 109 and 110 were all molded using the same molding parameters. The maximum number of deflections performed in this test was 2000.

It can be seen from data entries 119–134 that latches on housings comprised of PPSU did not break off or crack after 2000 deflections, regardless of variations in the molding parameters used. In fact, further testing of PPSU to 5,000 deflections (not shown) exhibited no failures. In contrast, the point at which the latches on housings comprised of PEI broke varied dramatically as the molding parameters were varied. For example, data entries 103 through 106 correspond to a melt temperature of 700°, a mold temperature of 200° F. (93° C.) and a fill rate of 99%. Looking at the vertical axis 102 and the bars associated with these this entries, it can be seen that the latches cracked after a number of deflections ranging from 835 to 1,848. In contrast, for entries 115 through 118, which are associated with molding parameters that appeared to be seemed optimized for PEI for the mold used, the latches performed, on average, better. In these cases, the temperature of the melt was 750° F. (398° C.), the temperature of the mold was 250° F. (121° C.) and the fill rate was 99%. Therefore, data entries 103–118 demonstrate that variations in molding parameters can drastically affect the integrity of the latch when PEI is used as opposed compared to when PPSU is used for the molding material, as demonstrated by data entries 119–134.

Figure 9:
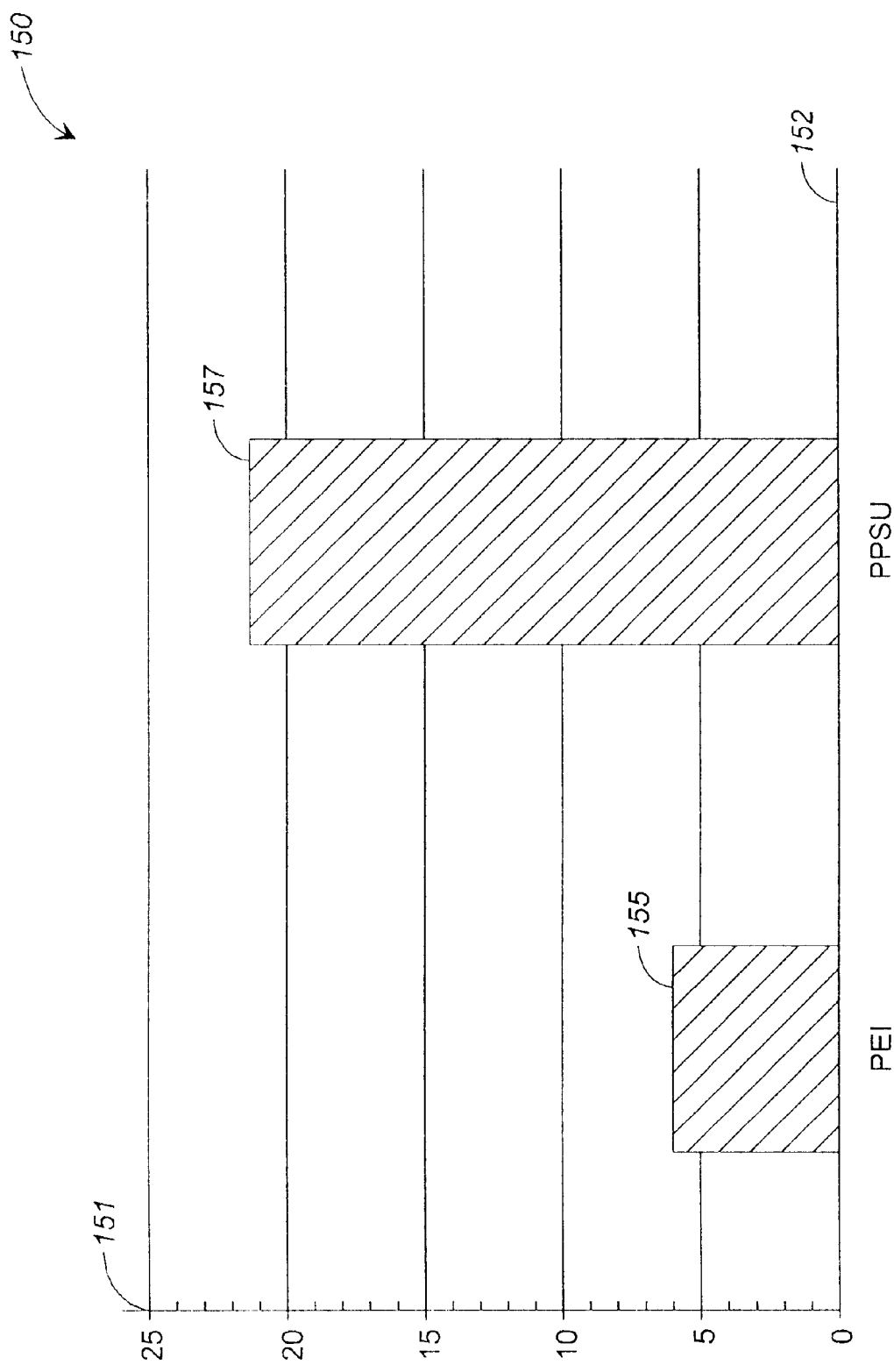
FIG. 9 is a graph illustrating results of a destructive 90° bending test performed on latches of housing comprised of PEI and latches of housings comprised of PPSU.

FIG. 9 illustrates a graph 150 containing data associated with a different test that was performed on the latches for housings made of PPSU and PEI. This test is called the 90° test and is a destructive test. In this test, the latch is bent away from the surface to which it is attached, i.e., in a direction opposite to the direction in which it is flexed when performing the deflection test. For example, with reference to housing 10 shown in FIG. 4, this test would correspond to bending the latch 37 upwardly away from the central axis 54 of the housing 10. Of course, latches of this type are not made to be bent in this direction and, therefore, only survive a certain number of bends in this direction.

The vertical axis 151 corresponds to the number of bends of the latch and the horizontal axis 152 corresponds to the housing material. The bar 155 corresponds to the housing material being comprised of PEI and a melt and mold temperature of 720° and 250° F., respectively. The bar 157 corresponds to the housing material being comprised of PPSU and a melt and mold temperature of 720° F. (382° C.) and 250° F. (121° C.), respectively. Therefore, the molding parameters chosen were identical for both materials. The bar 155 corresponds to approximately 6 bends and the bar 157 corresponds to approximately 21 bends. The results are an average of several housings comprised of each material. Therefore, these results demonstrate that PPSU has flexure properties that are clearly superior to those of PEI.

As stated above, it is also important that the material that is used for fabricating the housing of an optical connector have good knitting properties. It was also determined through testing that PPSU has better knitting properties that PEI. Good knitting properties also make breaking or cracking of the housing, or of particular features thereof, less likely to occur. Therefore, breaking or cracking of housings made of PPSU is less likely to occur than if the housings are made of PEI. Another advantage of using PPSU for optical connectors is that PPSU has substantially the same shrinkage rate as PEI, which is approximately 0.6%. Therefore, the same tools that are used for creating optical connector housings using PEI can also be used to create optical connector housings using PPSU. This is advantageous because retooling is very expensive and is unnecessary if tooling already exists for molding housings out of PEI.

It should be noted that the present invention has been described with respect to the preferred embodiments and that the present invention is not limited to these embodiments. Those skilled in the art will understand that modifications can be made to the embodiments discussed above, and that such modifications are within the scope of the present invention.

What is claimed is:

1. An optical connector for terminating an optical fiber, the optical connector comprising:

a fiber-holding structure having an end face in which the optical fiber is to terminate, the fiber-holding structure including an axial passageway which terminates in the end face and which is adapted to receive an end portion of the optical fiber; and a housing having internal surfaces that define a cavity and surround the fiber-holding structure, the housing including a first opening for receiving an optical fiber and a second opening for enabling the end face of the fiber-holding structure to protrude therefrom, the housing being comprised of polyphenylsulfone.

2. The optical connector of claim 1, wherein the housing is comprised of RADEL® R polyphenylsulfone.

3. The optical connector of claim 1, wherein the fiber-holding structure is a ferrule assembly, the ferrule assembly comprising:

a first end, a second end and an axial passageway extending from the first end to the second end, the second end of the ferrule assembly adapted to maintain an end of the optical fiber in a substantially fixed position with respect to the second end of the ferrule assembly, the optical fiber passing through the axial passageway of the ferrule assembly.

4. The optical connector of claim 3, wherein the ferrule assembly comprises:

a barrel portion having a first end and a second end and an axial passageway formed therein, the second end of the barrel having a hexagonal cross-section;

a ferrule having a first end and a second end, the first end of the ferrule being fixedly secured to the second end of the barrel, the ferrule having an axial passageway formed therein for receiving said end of the optical fiber, said end of the optical fiber passing through the axial passageway of the barrel and through the axial passageway of the ferrule such that said end of the optical fiber is disposed in the second end of the ferrule; and a flexible tube having a first end and a second end and an axial passageway formed therein, the second end of the tube being fixedly secured to the first end of the barrel, the optical fiber passing through the axial passageway of the tube.

5. The optical connector of claim 4, wherein the housing further comprises:

an annular cylindrical portion having a first end and a second end, the first end of the annular cylindrical portion being adjacent the first opening of the housing; and a recess having a hexagonal cross-section adapted to receive the second end of the barrel of the ferrule assembly, wherein when the ferrule assembly is secured within the housing, the second end of the barrel having the hexagonal cross-section is seated within the recess having the hexagonal cross section.

6. The optical connector of claim 5, further comprising:

a spring having a generally helical shape, the spring being disposed about the tube of the ferrule assembly when the ferrule assembly is securing within the housing, the spring having a first end and a second end, wherein when an insert engages the ferrule assembly, the second end of the insert is inserted over the first end of the tube and is placed in contact with the first end of the spring, and wherein when the insert is fixedly secured within the housing by a locking of keying mechanisms, the spring is preloaded and the second end of the spring is in contact with the second end of the barrel, the second end of the barrel preventing the second end of the spring from coming into contact with the ferrule, and wherein when the second end of the barrel is not seated in the recess of the housing, the second end of the barrel is rotatable to enable an eccentricity parameter associated with the ferrule assembly to be tuned.

7. The optical connector of claim 3, wherein the first opening in the housing has a substantially square shape, the housing having at least a first slot formed in a first surface thereof, the first slot extending from the first opening a predetermined distance in a direction from the first opening toward the second opening, the predetermined distance corresponding to length of the slot, the slot enabling the housing to be flexed outwardly in directions transverse to the length-wise direction of the slot, the housing comprising a keying mechanism, and wherein the optical connector further comprises:

an insert having a first opening formed in a first end thereof, a second opening formed in a second end thereof, and a passageway for allowing an optical fiber to pass through the insert, the second end of the insert adapted to engage the first end of the ferrule assembly, the insert comprising a keying mechanism, the insert being adapted to be secured to the housing by pressing the insert into the housing until the keying mechanism of the insert interlocks with the keying mechanism of the housing, the insert securing the ferrule assembly within the housing and preventing the ferrule assembly from being inadvertently removed from the housing when the second end of the insert is engaged with the first end of the ferrule assembly and the keying mechanism of the insert is interlocked with the keying mechanism of the housing.

8. The optical connector of claim 7, wherein the housing has a second slot formed in a second surface thereof, the second slot extending from the first opening a predetermined distance in a direction from the first opening toward the second opening, the predetermined distance corresponding to length of the second slot.

9. The optical connector of claim 7, wherein the housing further comprises:

a manually operated latch adapted to secure the housing to an associated adapter to thereby prevent unintended decoupling of the housing from the adapter, the latch being positioned on a single side surface of the housing and movable in a direction that is perpendicular to the axial passageway of the ferrule assembly, the latch comprising a cantilever beam having a fixed end positioned toward the second opening of the housing and a free end extending in a direction away from the fixed end and away from the second opening.

10. The optical connector of claim 7, wherein the insert has a substantially rectangular cross-section, and wherein when the insert is inserted into the first opening of the housing, the substantially square cross-section of the first opening of the housing aligns with the substantially rectangular cross-section of the insert to thereby cause the keying mechanism of the housing to align with the keying mechanism of the insert.

11. The optical connector of claim 9, wherein the keying mechanism of the insert comprises a flange integrally formed about the insert, the flange having a substantially rectangular cross-section, the flange comprising two oppositely located flat sides and two oppositely located keys, the keys corresponding to the keying mechanism of the insert, each of the keys having a chamfered surface, each key being separated from the other key by one of the flat sides of the flange, the keys and flat surfaces forming a configuration that defines the substantially rectangular cross-section, and wherein the keying mechanism of the housing comprises first and second keyways formed in first and second surfaces of the housing, the surfaces of the housing in which the keyways are formed being opposite each other and transverse to the surfaces in which the slots are formed, wherein when the insert is pressed into the first opening of the housing a predetermined distance, the chamfered surfaces of keys of the flange cause the surfaces of the housing in which the keyways are formed to be deflected away from each other, the keys of the flange locking into the keyways when the insert has been pressed a predetermined distance into the first opening of the housing, the locking of the keys with the respective keyways locking the insert in a substantially fixed position with respect to the housing, and wherein the slots formed in the housing allow the surfaces of the housing in which the keyways are formed to be deflected away from each other.

12. A method for fabricating a housing of an optical connector, the housing adapted for receiving a fiber-holding structure therein, the fiber-holding structure being adapted to hold an end of an optical fiber, the method comprising the steps of:

selecting a mold to be used for molding the housing;

selecting molding parameters to be utilized, the molding parameters including a temperature of the mold, a temperature of a molten material to be placed in the mold, and a fill rate, the molten material corresponding to a material of which the housing is to be comprised, the fill rate corresponding to a rate at which the mold is filled; and placing the molten material in the mold, wherein the molten material is polyphenylsulfone.

* * * * *